United States Patent [19]

Dhingra et al.

[11] Patent Number: 5,302,623

[45] Date of Patent: Apr. 12, 1994

[54] METHOD OF STABILIZING CATION-EXCHANGE RESINS AGAINST OXIDATIVE DEGRADATION

[75] Inventors: Yog R. Dhingra, Midland; Paul R. VanTol, Essexville, both of Mich.

[73] Assignee: The Dow Chemical Company, Midland, Mich.

[21] Appl. No.: 25,006

[22] Filed: Mar. 2, 1993

Related U.S. Application Data

[63] Continuation-in-part of Ser. No. 666,117, Mar. 7, 1991, abandoned.

[51] Int. Cl.$^5$ .................. B01J 39/18; B01J 41/08; C08F 8/36; C08J 5/20
[52] U.S. Cl. .................. 521/38; 521/32; 521/33; 521/37; 526/278; 526/287; 526/317.1; 526/346; 526/347; 526/909
[58] Field of Search ................ 521/33, 38, 32

[56] References Cited

U.S. PATENT DOCUMENTS

| | | | |
|---|---|---|---|
| 2,500,149 | 3/1950 | Boyer | 521/33 |
| 2,631,127 | 3/1953 | D'Alelio | 521/33 |
| 2,664,801 | 1/1954 | Eisbein | 354/301 |
| 2,764,564 | 9/1956 | McMaster et al. | 521/33 |
| 3,256,250 | 6/1966 | Frilette | 521/33 |
| 3,266,007 | 8/1966 | Sullivan | 439/733 |
| 3,342,755 | 9/1967 | Calmon et al. | 521/33 |
| 4,192,921 | 3/1980 | Dales | 521/38 |
| 4,224,415 | 9/1980 | Meitzner et al. | 521/38 |
| 4,246,386 | 1/1981 | Howell et al. | 526/207 |
| 4,269,943 | 5/1981 | Costin | 521/33 |
| 4,283,499 | 8/1981 | Howell | 521/38 |
| 4,382,124 | 5/1983 | Meitzner et al. | 521/38 |
| 4,419,245 | 12/1983 | Barrett et al. | 210/681 |
| 4,564,644 | 1/1986 | Harris | 521/28 |

FOREIGN PATENT DOCUMENTS

| | | |
|---|---|---|
| 2218126 | 10/1973 | Fed. Rep. of Germany . |
| 136503 | 7/1979 | Fed. Rep. of Germany . |
| 2936922 | 3/1980 | Fed. Rep. of Germany . |
| 2139877 | 1/1973 | France . |
| 52-120982 | of 1977 | Japan . |
| 84052165 | of 1984 | Japan . |
| 1393594 | of 1975 | United Kingdom . |
| 2031906 | 4/1980 | United Kingdom . |

OTHER PUBLICATIONS

R. M. Wheaton et al. "Ion Exchange" *Kirk-Othmer Ency. Chem. Tech.*, pp. 871–899, vol. 11 (2nd Ed., 1966).
Calvin E. Schildknecht, *Polymer Processes*, Interscience Publishers, Inc., New York, Chapter III, 1956.
F. Helfferich, *Ion Exchange*, (McGraw-Hill, 1962) pp. 29–43.

*Primary Examiner*—Fred Zitomer

[57] ABSTRACT

Cation-exchange resins are provided which have improved resistance to copolymer degradation caused by oxidizing agents like molecular oxygen. The resins are prepared by incorporating a para-substituted styrenic monomer having an oxidation-stabilizing moiety in a position para to a polymerizable vinyl moiety. These cation-exchange resins can be used in separation processes for longer periods of time without detrimental increases in bed pressure drops, loss of operating capacity, or leaching of organic contaminants.

7 Claims, No Drawings

METHOD OF STABILIZING CATION-EXCHANGE RESINS AGAINST OXIDATIVE DEGRADATION

RELATED U.S. APPLICATION DATA

Continuation-in-part of Ser. No., 666,117, Mar. 7, 1991, now abandoned.

BACKGROUND OF THE INVENTION

This invention concerns a method of stabilizing cation-exchange resins against oxidative degradation.

Cation-exchange resins are widely employed by industry to remove impurities from liquid mixtures, or to separate various components contained in such mixtures. Conventional ion-exchange resins are prepared by functionalizing a copolymer matrix with groups having anions or cations which are capable of being exchanged for, or associated with, ions or molecules having the same charge when the resin is in contact with a liquid mixture. Such resins have generally been used in water treatment and purification, food preparation, pharmaceutical manufacturing, chemical processing, metal extraction, and so on, as is generally discussed by R. M. Wheaton et al. in, "Ion Exchange", 11 *Kirk-Othmer Ency. Chem. Tech.* pp. 871-899 (2nd Ed. 1966).

One problem associated with conventional cation-exchange resins is oxidative degradation of the copolymer matrix over an extended period of time. Liquid mixtures which are typically in contact with the resin inherently contain quantities of oxidizing species such as molecular oxygen, or may have an elevated temperature, both of which may promote more rapid degradation of the copolymer matrix. It is believed that during oxidative degradation, carbon-carbon bonds rupture with respect to cross-links between individual polymer chains and/or links between individual styrene moieties. The loss of such bonds results in an increase in water retention capacity and, ultimately, in the release of organic contaminants, such as segments of functionalized linear polystyrene. As used hereinafter, the term "oxidative degradation" refers to such degradation of the copolymer matrix.

Degradation of the copolymer matrix is undesirable for commercial operation of an ion-exchange or chromatographic process. For example, resins which de-cross-link become relatively soft and swell to a greater extent. Such changes ultimately result in an increased bed pressure drop, a reduced flow rate for the liquid mixture being treated, and reduced operating capacity for removing chemical species when such resins are employed in a typical ion-exchange or chromatographic column. Additionally, the release of organic contaminants into column effluent can be unacceptable in some applications, such as those used in preparing food products. Organic contaminants may also create a source of potential corrosion to process equipment. Organic contaminants may also foul anion-exchange resins associated with a process, such as in a mixed-bed application where both cation- and anion-exchange resins are mixed together, or when an anion-exchange resin is employed in a subsequent process step.

Previously, industry attempted to remedy oxidative degradation and its associated problems by increasing the amount of cross-linking monomer used in preparing the copolymer matrix. However, an increase in the number of cross-links renders the resulting resin bead less compatible with liquid mixtures, thereby resulting in reduced diffusion into the bead and poor operating capacity. A highly cross-linked resin also generally exhibits poor regeneration efficiencies and may be impermeable with respect to large molecules, such as glucose, fructose, and other sugars. Furthermore, increasing the cross-link density does not address problems associated with release of organic contaminants, since degradation still occurs.

U.S. Pat. No. 3,342,755 issued to Calmon et al. discloses a postulated mechanism for degradation of the copolymer matrix by identifying a so-called "weak link" at tertiary carbons adjacent to the benzene ring of a styrene moiety. This weak link is said to exist, due to the tendency of hydrogen attached to the tertiary carbons to form hydroperoxides with oxidizing agents like molecular oxygen or chlorine. The hydroperoxides are said to eventually lead to splitting of carbon chains associated with the copolymer. Calmon et al. attempt to solve the problem by substituting a halogen for the hydrogen at the tertiary carbon, and further disclose that nuclear halogenation, i.e., employing a monomer such as ortho-chlorostyrene, does not contribute to resin stability.

As can be seen, it is desirable to develop cation-exchange resins which have improved resistance to oxidative degradation. Use of such resins in an ion-exchange or chromatographic separation process would promote a more efficient and reliable process.

SUMMARY OF THE INVENTION

The above objects and advantages are obtained by cation-exchange resins having improved resistance to oxidative degradation. The present invention concerns a method for improving the resistance of styrenic cation-exchange resins to oxidative degradation by incorporating into the copolymer beads a styrenic monomeric unit in which the aromatic ring is substituted in the position para to the polymerizable vinyl moiety with an oxidation-stabilizing moiety. The oxidation-stabilizing moiety is substantially inert during substitution of the copolymer beads with the cation-exchange functional groups and, thereby, substantially prevents functionalization at the para position.

DETAILED DESCRIPTION OF THE INVENTION

Cation-exchange resins are generally prepared by functionalizing a plurality of copolymer beads. The copolymer beads are commonly prepared by suspension polymerization methods wherein a suspended monomer phase is polymerized within a continuous phase that is substantially immiscible with the monomer phase. Typically, the monomer phase is characterized by having a major amount of a monovinyl monomer like styrene, along with a minor amount of a cross-linking monomer such as divinylbenzene, and an effective amount of a free-radical polymerization initiator. Thereafter, the resulting copolymer beads are converted to cation-exchange resins by functionalization with, for example, sulfonic, carboxylic, or phosphonic acid ion-exchange moieties according to known methods.

It has now been discovered that use of certain para-substituted styrenic monomers in preparing the copolymer beads results in resins which are highly resistant to oxidative degradation. As used hereinafter, the term "para-substituted styrenic monomer" refers to monomers comprising a six-membered carbon aromatic ring, i.e., a benzene ring, having, as substituents to the ring, an addition-polymerizable vinyl moiety in a para position to an oxidation-stabilizing moiety. The term "oxidation-stabilizing moiety" refers to any moiety which is substantially inert during functionalization of the copolymer beads and, thereby, substantially prevents substitution of ion-exchange functional groups at the para position. The term "addition-polymerizable vinyl moiety" refers to any ethylenically unsaturated substituent which is capable of rendering the *para*-substituted styrenic monomer susceptible to addition-type polymerization. The term "conventional cation-exchange resin" as used herein refers to resins prepared substantially from conventional monovinyl aromatic monomers which are not para-substituted with an oxidation stabilizing moiety.

Preferred para-substituted styrenic monomers correspond to Formula I:

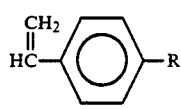

Formula I wherein R is halogen, phenyl, or an aliphatic moiety which has up to about eight carbon atoms. Where R is aliphatic, it preferably has less than about six carbons, more preferably less than about three carbons, and most preferably one carbon. Examples of preferred aliphatic moieties are alkyls like methyl, ethyl, propyl, or butyl. Where R is halogen, it is preferably bromine or chlorine, and most preferably chlorine. Examples of preferred para-substituted styrenic monomers are para-methylstyrene, para-ethylstyrene, para-bromostyrene, and para- chlorostyrene.

The para-substituted styrenic monomers can be used alone or in admixture with the monovinyl monomers typically used to prepare cation-exchange resins. Such conventional monomers are known in the art and reference is made to *Polymer Processes,* edited by Calvin E. Schildknecht, published in 1956 by Interscience Publishers, Inc., New York, Chapter III, the relevant teachings of which are incorporated by reference. Of interest are water-insoluble monomers including monovinyl aromatics such as styrene, vinyl naphthalene, and isomeric mixtures of alkyl-substituted styrenes (particularly monoalkyl-substituted styrenes such as vinyltoluene and ethyl vinylbenzene) and halo-substituted styrenes like bromo- or chlorostyrene: esters of α, β-ethylenically unsaturated carboxylic acids, such as acrylic or methacrylic acids: and mixtures of one or more of said monomers. However, it is preferred that the amount of such monovinyl monomers be less than about 50 percent, more preferably less than about 20 percent, and most preferably less than about 10 percent, based on the weight of all monomers employed.

Most commercially available chloro- and bromostyrene mixtures contain largely the para- and ortho-substituted isomers with only a minor amount of the meta-substituted isomer being present. Resins prepared from such mixtures exhibit a beneficial amount of oxidation resistance, as illustrated by Example 3 hereinafter. Without wishing to be bound, it is believed that the ortho-substituted isomers, when incorporated into the copolymer bead matrix, are preferentially substituted with cation-exchange functional groups at positions other than the position para to the polymerizable vinyl moiety.

A variety of cross-linking monomers may be employed in preparing the copolymer beads. Suitable cross-linking monomers are addition polymerizable polyvinyl compounds. Such monomers are well-known in the art and reference is made to *Polymer Processes,* edited by Calvin E. Schildknecht, published in 1956 by Interscience Publishers, Inc., New York, Chapter III, the relevant teachings of which are incorporated by reference. Of particular interest are water-insoluble polyvinyl aromatics such as divinylbenzene, divinyltoluene, divinylxylene, divinylnaphthalene, trivinylbenzene, divinyldiphenyl ether, diisopropenylbenzene, triisopropenylbenzene and divinyldiphenylsulfone. Also suitable for use as a cross-linking monomer are polyvinyl α, β-ethylenically unsaturated carboxylic acids and esters thereof. Preferred cross-linking monomers are divinylbenzene, trivinylbenzene, diisopropenylbenzene and triisopropenylbenzene.

The copolymer beads may be prepared by suspension polymerization methods generally known in the art. Suitable polymerization techniques include, for example, a single-stage polymerization process described by F. Helfferich, *Ion Exchange,* (McGraw-Hill 1962) at pages 35–36, wherein a water-immiscible monomer mixture is suspension polymerized in a continuous aqueous phase to produce copolymer beads. Generally, the cross-linking monomer is employed in an amount of from about 0.1 to about 20 weight percent, and preferably from about 2 to about 12 weight percent based on total weight of the monomers employed. The balance of the monomer mixture consists essentially of para-substituted styrenic monomer and any other monovinyl monomer. The weight ratio of the monomer phase to the continuous aqueous phase is generally from about 0.5 to about 1.5.

Also suitable for preparing the copolymer bead matrix is a so-called multi-staged polymerization process. A multi-stage polymerization, also known as a "seeded'-'polymerization, adds monomers in two or more increments, each increment comprising at least about 5 percent, and preferably at least about 10 percent of the weight of the monomers employed. Each increment is followed by complete or substantial polymerization of the monomers therein before adding a subsequent increment. These so-called seeded polymerizations, as well as continuous or semi-continuous staged polymerizations, are described in U.S. Pat. Nos. 4,419,245 and 4,564,644, the relevant teachings of which are incorporated herein by reference.

A multi-stage polymerization is advantageously and preferably conducted as a suspension polymerization process, wherein the monomers are dispersed as a plurality of droplets in a continuous aqueous phase and polymerized therein. In this process, staged polymerization is readily accomplished by forming a suspension of an initial increment of monomers, wholly or partially polymerizing the same, and then adding the remaining monomers in one or more increments. Each increment may be added at once, or continuously. Due to the insolubility of the monomers in the aqueous phase and their solubility in the copolymer particles, the monomers migrate to the copolymer particles, are imbibed thereby and polymerize therein. The multi-stage polymerization techniques can vary in terms of the type and amount of monomers used for each stage, the proportion of cross-linking monomer used in each stage, and the conditions under which the monomers are added in each stage.

In a preferred multi-staged process, the last polymerization stage employs a monomer mixture containing substantially no free-radical initiator. This mixture, which preferably comprises about 10 to about 80, preferably about 25 to about 75 weight percent of the final copolymer particles, is added to the suspension under polymerization conditions. The copolymer particles formed in earlier stages contain a source of free radicals so that, upon migration to the copolymer particles, the monomer mixture polymerizes therein. Such a free-radical source may be previously imbibed initiator, or the residue of a partially polymerized monomer mixture from a preceding polymerization stage. Such a process is described in U. S. Pat. No. 4,564,644, previously incorporated by reference.

In a preferred multi-staged process, the copolymer beads are prepared by swelling seed copolymer particles in a first step with a first monomer mixture having, in terms of weight percent of the monomer mixture, desirably from about 1 to about 20, preferably about 3 to about 14, and more preferably from about 5 to about 10 weight percent of a cross-linking monomer, the balance consisting essentially of the *para*-substituted styrenic monomer, any other monovinyl monomer and an effective amount of a free-radical initiator. The swollen seed copolymer particles are then partially polymerized with the first monomer mixture. The seed particles advantageously comprise about 10 to about 70, preferably about 25 to about 60 weight percent of the final product copolymer bead and have preferably from about 0.1 to about 12 and more preferably from about 0.3 to about 5 weight percent of cross-linking monomer, with the balance being essentially the para-substituted styrenic monomer and any other monovinyl monomer. The first monomer mixture is advantageously polymerized in this stage to about 20 to about 90, and preferably about 50 to about 75 percent conversion.

Thereafter, a second monomer mixture is added continuously to the suspended seed copolymer particles under polymerization conditions such that the monomers are imbibed by the particles and polymerized therewith. The second monomer mixture contains, in terms of weight percentage of the mixture, preferably from about 0 to about 12, more preferably about 2 to about 10, and most preferably about 3 to about 9 weight percent of a cross-linking monomer, the balance of the second monomer mixture consisting essentially of the para-substituted styrenic monomer and any other monovinyl monomer and substantially no free radical initiator.

Copolymer beads formed by a multi-staged process exhibit a core/shell morphology which is more fully described in U.S. Pat. No. 4,564,644, previously incorporated by reference. Generally, the term "core/shell morphology" means that the polymeric structure of the copolymer bead varies with the distance from the center of the bead. For example, the changes in polymeric structure may be gradual and, thus, give rise to a bead having a gradient of polymeric structure along any radius thereof. Alternatively, the change in polymeric structure may be relatively abrupt at some point along the radius, thereby yielding a bead having a substantially distinct inner core of one polymeric structure and a substantially distinct outer shell having another polymeric structure. In either case, the terms "core" and "shell" generally refer to the polymeric structure of the inner and outer portions of the bead, respectively, and do not necessarily imply a sharp interface between the core or shell.

With respect to resins prepared from copolymer beads made in a multi-stage polymerization process, it is possible to employ conventional monovinyl monomers in one or more of the polymerization stages and still obtain a resin having a beneficial amount of oxidation resistance. For example, the seed copolymer particles may be made of the para-substituted styrenic monomer and, in subsequent polymerization stages, a monovinyl monomer is used. Conversely, the seed copolymer particle may be made of a monovinyl monomer and, in subsequent polymerization stages, the para-substituted styrenic monomer is used. In these instances, the para-substituted styrenic monomer is preferably employed in polymerization stages using the least amount of cross-linking monomer. Also, it is preferred that the para-substituted styrenic monomer be employed in those stages using less than about 4 weight percent of a cross-linking monomer, based on the weight of monomers employed in such stage.

The free-radical initiator employed may be any of a diverse number of conventional initiators well-known in the art for polymerization of the monomers as previously described. Representative of such initiators are UV radiation and chemical initiators including azo compounds such as azobisisobutyronitrile: peroxygen compounds such as benzoyl peroxide, t-butyl peroctoate, t-butyl perbenzoate and iso-propyl percarbonate. Other suitable initiators are disclosed in U.S. Pat. Nos. 4,192,921; 4,246,386: and 4,283,499, the teachings of which are incorporated herein by reference.

The free-radical initiator is employed in an effective amount sufficient to cause polymerization of the monomeric components of a monomer mixture. An effective amount will generally vary depending on a variety of factors including the type of initiator, temperature employed, and the type and proportion of monomers being polymerized. Generally, the initiator is employed in amounts from about 0.02 to about 1 weight percent, and preferably from about 0.05 to about 0.5 weight percent, based on the total weight of the monomers employed.

A liquid diluent which is substantially inert under polymerization conditions may also be incorporated into the monomer phase to obtain macroporous copolymer beads. The term "macroporous" (also referred to as macroreticular) is well-known in the art and, in general, refers to resins prepared from copolymer beads which have regions of densely packed polymer chains exhibiting molecular-sized porosity which are separated by copolymer-free voids, often referred to as mesopores (50–200Å) and macropores (>200Å). In contrast, gel-type, or microporous, resins have pores generally of molecular-size (generally less than about 50Å). Macroporous and microporous resins are further described in U.S. Pat. Nos. 4,224,415 and 4,382,124, the teachings of which are incorporated herein by reference. Resins of the present invention may be prepared from either macroporous or microporous copolymer beads, but the benefits of the invention are particularly applicable to resins based upon microporous copolymer beads. Resins prepared from a microporous copolymer typically have a relatively smaller proportion of cross-linking monomer therein to promote resin permeability with respect to the liquid being treated. Such lightly cross-linked copolymer beads are more sensitive to oxidative degradation.

The resulting copolymer beads may be converted to sulfonated cation-exchange resin using known techniques. For example, sulfonated cation-exchange resins may be prepared from copolymer beads using methods described, for example, in U.S. Pat. Nos. 3,266,007: 2,500,149: 2,631,127: 2,664,801: and 2,764,564 and F. Helfferich, supra, the relevant teachings of which are incorporated herein by reference. Such sulfonated resins are the most common type of cation-exchange resin presently used by industry.

In general, sulfonated cation-exchange resins are prepared by reacting the copolymer beads with a sulfonation agent, such as concentrated sulfuric acid (acid which has greater than about 95 weight percent sulfuric acid based upon total weight), oleum, chlorosulfonic acid, or sulfur trioxide, at an elevated temperature and for a time sufficient to achieve a desired degree of sulfonation. A preferred sulfonation agent is sulfuric acid. The amount of concentrated sulfuric acid should be sufficient to provide adequate mixing during reaction, with a weight ratio of acid to beads of from about 5:1 to about 10:1 being generally sufficient. Typically, the acid and copolymer beads are maintained at a temperature of from about 50° C. to about 150° C. for a time sufficient to obtain resin having a dry weight capacity of at least about 2.5 milliequivalents per gram (meq/g). Other sulfonation conditions are known in the art.

Prior to sulfonation, the copolymer beads are typically allowed to swell for at least about 30 minutes with both a swelling agent and the sulfonation agent to allow for more uniform penetration of the sulfonation agent into the copolymer beads. Suitable swelling agents are organic solvents which do not react with the copolymer beads or the sulfonation agent employed. Examples of suitable swelling agents are chlorinated hydrocarbons like chlorobenzene, methylene chloride, or ethylene dichloride. Use of such swelling agents is well-known in the art. Seeded copolymers may also be successfully sulfonated without the use of swelling agents.

After sulfonation, the resin is hydrolyzed and in some applications, it may be advantageous to convert it to a metal salt. The resin is advantageously hydrolyzed by washing it with a series of sulfuric acid solutions, each of which is successively more dilute in comparison to the sulfuric acid solution used in the preceding acid wash, and finally with water. Other methods to hydrolyze the resin are also suitable.

After hydrolysis, the washed resin may be converted to a desired metal salt form by contact with a dilute aqueous solution of a water-soluble metal salt or base having a desired metal counterion. For example, the resin can be converted to its calcium form by contact with a 5-10 percent by weight calcium chloride solution or a saturated calcium hydroxide solution. The resin may be converted to other forms in like manner using water-soluble salts of the desired metal counterion. Preferred metal counterions are calcium, magnesium, sodium, and potassium, with calcium being most preferred.

After sulfonation, the resin suitably has a dry weight capacity of at least about 2.5 milliequivalents per gram (meq/g), preferably at least about 4.0 meq/g, more preferably at least about 5.0 meq/g. Dry weight capacity may be measured by analytical techniques well-known in the art.

The present invention is applicable to other types of cation-exchange resins, provided the copolymer matrix employed is one which is subject to oxidative degradation as previously mentioned. For example, F. Helfferich in *Ion Exchange. supra.* at pp. 29–43, the teachings of which are incorporated herein by reference, describes preparation of cation-exchange resins having phosphonic, phosphinic, arsonic and carboxylic acid groups substituted onto a copolymer matrix.

The cation-exchange resin suitably exhibits a water retention capacity of less than about 70 percent. Water retention capacity is determined by swelling a weighed amount of resin with water, removing excess water, and then weighing the fully swollen resin. The swollen resin is then dried until a constant weight is obtained. Water retention capacity is the ratio of water imbibed to the total combined weight of the resin plus imbibed water. Water retention capacity, on a fully functionalized basis, is advantageously from about 40 percent to about 65 percent, with from about 50 to about 60 percent being preferred. As used herein, water retention capacity is measured with the resin in its calcium form.

The oxidation-resistant resins disclosed herein may be employed in a separation process, such as a chromatographic separation process or an ion-exchange separation process. In such a process, the resins exhibit substantial resistance to oxidative degradation which is characterized, for example, by comparing changes in water retention capacity over time for the present resins with the same type of data for otherwise similar conventional resins exposed to substantially similar conditions.

For example, FIG. 1 is a graphical presentation of data associated with Examples 1-2 and Comparative Examples A-B herein. The resins of the invention (Examples 1-2) display water retention capacity values which increase at a rate which is substantially less than the rate associated with otherwise similar conventional resins (Comparative Examples A-B). Such reduced rates allow a separation process to operate efficiently for longer periods of time relative to use of conventional resins, without undesirable increases in bed pressure drop, decreases in flow rate of the liquid mixture being treated, or release of undesirable organic contaminants.

The resins disclosed herein are also useful in chemical processes where oxidation resistance is desirable. For example, cation-exchange resins are commonly employed in a fixed bed as catalysts for numerous organic reactions, such as the alkylation of aromatic rings, esterification of alcohols, and in particular, preparation of methyl tert-butyl ether. Oxidation resistance allows for use of the resins in these applications for longer periods of time without undesirable increases in bed pressure drop, decreases in flow rate of reactants involved, or release of undesirable organic impurities.

SPECIFIC EMBODIMENTS OF THE INVENTION

The following examples illustrate the present invention and should not be construed, by implication or otherwise, as limiting the scope thereof. All parts and percentages are by weight and all temperatures are in degrees Celsius (°C.) unless otherwise indicated.

EXAMPLE 1

A. Resin Preparation

Copolymer beads are prepared by suspension polymerization of a monomer mixture in a continuous aqueous phase. A three liter (L), stainless steel reactor is loaded, under agitation, with 1000 grams (g) of an aqueous solution which consists of demineralized water, 0.14 weight percent of carboxymethyl methylcellulose, and 0.13 weight percent of sodium dichromate. Thereafter, a monomer mixture is added to the reactor, with agitation, consisting of 123 g of a commercially available divinylbenzene mixture, 1077 g of para-methylstyrene, and, as chemical initiators, 0.43 g of a 50 percent t-butylperoctoate solution and 0.60 g of t-butylperbenzoate. The divinylbenzene mixture is obtained from The Dow Chemical Company and consists of 55.6 percent divinylbenzene, the balance of the divinylbenzene mixture being essentially ethyl vinyl benzene.

After loading the above-described reactants, the reactor is sealed, purged with nitrogen, and the contents heated to a temperature of 75° C. which is maintained for about ten hours (hr). To complete polymerization, the reactor contents are heated to a temperature of 95° C. for an additional 1.5 hr and, thereafter, to a temperature of 110° C, for another 1.5 hr. The copolymer beads are recovered from the reactor, washed, and dried. The copolymer beads are then screened to remove any particles above 30 mesh or below 60 mesh in size.

The resulting copolymer beads are sulfonated according to well-known methods. A three-necked, round-bottom, glass reactor fitted with a mechanical stirrer and a drain valve is initially charged with 260 milliliters (mL) of a 99 weight percent sulfuric acid solution. A 50 g portion of the copolymer beads, as prepared above, is added to the reactor and agitation is thereafter initiated. The reactor is then charged with 15 mL of methylene chloride, a swelling agent, and the reactor contents are agitated for a 30 minute (min) period. The reactor is thereafter heated to a temperature of 115° C. over a 60 min period, and this temperature is maintained for an additional two hr to obtain substantially complete sulfonation of the copolymer beads.

The resulting sulfonated beads are hydrolyzed by successive rinses with dilute sulfuric acid solutions, wherein each acid rinse is less dilute in comparison to the immediately preceding acid rinse. The sulfonated beads are initially rinsed with 397 mL of a 43 percent aqueous sulfuric acid solution which is added dropwise into the reactor at a rate of about 10 mL per min (mL/min). This is followed by rinsing with 467 mL of a 19 percent aqueous sulfuric acid solution and 512 mL of a five percent aqueous sulfuric acid solution in the same manner. After each rinse, a volume of acid solution approximately equal to the amount added, is removed before proceeding with the next rinse. The resins are finally rinsed with deionized water to remove any residual acid. The resin is converted to its calcium form by gradually adding calcium hydroxide powder until reaching a pH of eight for the reactor contents. The resin is then washed a final time with water until the reactor contents reach a neutral pH.

Water retention capacity for the resin is thereafter determined by the procedure previously described herein. The sulfonated resin exhibits a water retention capacity of 50.0 percent in the calcium form.

B. Determination of Resin Oxidation Stability

Oxidation stability is determined by placing the sulfonated resin in a simulated oxidizing environment and, thereafter, sampling the resin at selected intervals to determine resin water retention capacity at the time each sample is collected. A 100 g portion of the sulfonated resin, in its calcium form, and 500 mL of deionized water are placed into a one L, four-necked, round-bottom flask. The flask is equipped with an overhead mechanical stirrer, a water inlet port, a water outlet port, and a glass sparge tube having a fritted end. A continuous flow of demineralized water through the flask via the inlet and outlet ports is provided by use of a Masterflex pump. The flow of water is such that the volume of water in the flask is maintained at a constant level. The water is also maintained at a temperature of 80° C. Oxygen gas is sparged into the flask contemporaneously with the deionized water flow. The flow of oxygen gas is maintained at about 50 mL/min.

At selected intervals, generally once every few days, a resin sample of approximately 10 g is recovered from the flask. Water retention capacity ("WRC") is determined for each respective sample according to the procedure previously described herein. The time of sampling, in terms of days after being exposed to the simulated oxidizing environment, and water retention capacity data are given in Table I.

TABLE I

Resin Oxidative Stability Data

| Example | Initial WRC (%) | WRC (%) After 1-20 Days of Exposure | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 16 | 17 | 20 |
| 1 | 50.0 | — | — | — | — | — | — | — | 50.4 | — | — | — | — | — | 50.8 | — | — | |
| A* | 49.6 | — | — | — | — | — | — | — | 56.9 | — | 58.0 | — | — | — | — | — | — | |
| 2 | 51.0 | — | 51.7 | — | 52.9 | — | — | — | — | — | 54.4 | — | — | — | — | — | — | |
| B* | 51.0 | — | 59.5 | — | 61.0 | — | — | — | — | — | 64.0 | — | — | — | — | — | — | |
| 3 | 50.8 | 50.9 | — | — | 51.0 | — | — | — | — | 51.1 | — | — | — | — | — | — | — | |
| 4 | 38.6 | — | 39.4 | — | — | 40.0 | — | 40.3 | — | 40.3 | — | — | 40.2 | — | 40.8 | 40.7 | 40.8 | |
| 5 | 51.4 | — | — | 52.9 | 53.7 | — | — | 54.3 | — | 55.5 | — | 55.8 | — | — | 56.6 | — | — | — |
| 6 | 51.1 | 52.3 | 53.6 | — | — | 55.1 | — | — | 56.0 | 56.0 | — | — | 56.0 | — | 56.2 | 57.2 | — | — |

*Not an embodiment of the present invention.

The data illustrates that resin water retention capacity for Example 1 remains essentially constant over a period of 16 days, thereby indicating no significant degradation of the copolymer matrix.

COMPARATIVE EXAMPLE A

The procedure of Example 1 is substantially repeated using styrene instead of para-methylstyrene. The results of the oxidation stability test are also given in Table I for comparison with the results of Example 1. The data for Comparative Example A shows a substantial rise in water retention capacity over a period of ten days, thereby indicating that the copolymer bead matrix is substantially degrading.

EXAMPLE 2

Example 2 concerns oxidation-resistant cation-exchange resin made from copolymer beads prepared in a multi-staged polymerization process. Copolymer beads employed are prepared by substantially following the seeded polymerization process described in Example 1 of U.S. Pat. No. 4,564,644 as well as column 7, line 3 to column 9, line 53 of the patent.

A three liter stainless steel reactor is initially loaded, under agitation, with 400 g of seed copolymer particles and 900 g of water. The seed copolymer particles are 2.5 percent by weight cross-linked para-methylstyrene/divinylbenzene copolymer particles having a volume average particle diameter of 220 μm. Thereafter, the reactor is charged with a first monomer mixture containing 164 g of para-methylstyrene, 16.2 g of a commercially available divinylbenzene mixture, and 0.72 g of a 50 percent t-butylperoctoate solution with 0.36 g of t-butylperbenzoate as polymerization initiators. The divinylbenzene mixture is obtained from The Dow Chemical Company and consists of 55.6 percent divinylbenzene, the balance of the divinylbenzene mixture being essentially ethyl vinyl benzene. The first monomer mixture therefore has a divinylbenzene content of five percent. The seed copolymer particles are then allowed to imbibe the monomers and initiator for a 30 min period.

Thereafter, an additional 275 g of water, 24 g of an aqueous one percent sodium lauryl sulfate solution, 1.8 g each of gelatin A and B, and 4 g of a 58 percent aqueous sodium dichromate solution are added to the reactor. The reactor is then sealed, purged with nitrogen, and the reactor contents heated to a temperature of 80° C. which is maintained for about 70 min to obtain partial conversion of the monomers within the seed copolymer particles.

At the conclusion of the 70 min period, a second monomer mixture is continuously fed to the reactor at a rate of 2.9 g per min (g/min) over a 225 min period. The second monomer mixture contains 613 g of para-methylstyrene and 35 g of the divinylbenzene mixture previously described, which gives a divinylbenzene content of three percent based upon the total weight of the second monomer mixture. The reactor contents are maintained at 80° C. during addition of the para-methylstyrene-divinylbenzene feed and, thereafter, for another six hr. The polymerization is concluded by heating the reactor contents to 95° C. which is maintained for 1.5 hr and, subsequently, to 110° C. which is maintained for an additional 1.5 hr. The resulting copolymer beads are recovered from the reactor and exhibit a volume average particle diameter of 350 μm. The copolymer beads are then sulfonated as in Example 1 and water retention capacity is measured with the resin in its calcium form.

The procedure of Example 1 is substantially repeated to determine oxidation stability. The results are given in Table I.

COMPARATIVE EXAMPLE B

The procedure of Example 2 is substantially repeated using styrene, instead of para-methylstyrene, in the seed copolymer particles and the first and second monomer mixtures. The results for oxidation stability testing are given in Table I for comparison with Example 2. The results show that oxidative degradation, as measured by an increase in water retention capacity over time, for Example 2 is considerably reduced in comparison with Comparative Example B.

EXAMPLE 3

The procedure of Example 1 is substantially repeated, except that a bromostyrene mixture obtained from Makhteshim Chemical Company is used rather than para-methylstyrene. The bromostyrene mixture contains approximately 47 percent para-bromostyrene, 47 percent ortho-bromostyrene, and 6 percent meta-bromostyrene. The monomer mixture is added to the reactor as in Example 1, but consists of 49.2 g of the divinylbenzene mixture, 758 g of the bromostyrene mixture, and, as chemical initiators, 0.58 g of a 50 percent t-butylperoctoate solution and 0.39 g of t-butylperbenzoate. All remaining procedures are the same as in Example 1. The water retention capacity data for oxidation stability testing is also given in Table I.

EXAMPLE 4

The procedure of Example 2 is substantially repeated, except that para-methylstyrene is used only in making the seed copolymer particles. Also, larger amounts of a cross-linking monomer are employed in the subsequent polymerization stages. The seed copolymer particles employed are 220 g of a 2.5 percent by weight cross-linked para-methylstyrene/divinylbenzene copolymer particles having a volume average particle diameter of 280 μm. The first monomer mixture contains 291 g of styrene, 49 g of the divinylbenzene mixture, and 1.22 g of the 50 percent t-butylperoctoate solution with 0.38 g of t-butylperbenzoate. The first monomer mixture therefore has a divinylbenzene content of 8 percent. The second monomer mixture is continuously fed to the reactor at a rate of 2.25 g/min over a 250 min period. The second monomer mixture contains 482 g of styrene and 81 g of the divinylbenzene mixture, which gives a divinylbenzene content of 8 percent based upon the total weight of the second monomer mixture. All other procedures are substantially the same. The oxidation stability data appears in Table I.

EXAMPLE 5

The procedure of Example 2 is substantially repeated, except that para-methylstyrene is used only in the second monomer mixture. The seed copolymer particles are 2.5 percent by weight cross-linked styrene/divinylbenzene copolymer particles having a volume average particle diameter of 210 μm. The first monomer mixture contains 164 g of styrene, 16.2 g of the divinylbenzene mixture, and 0.65 g of the 50 percent t-butylperoctoate solution with 0.34 g of t-butylperbenzoate. The first monomer mixture therefore has a divinylbenzene content of 5 percent. The second monomer mixture is continuously fed to the reactor at a rate of 2.6 g/min over a 240 min period. The second monomer mixture contains 57.9 g of *para*-methylstyrene and 33 g of the divinylbenzene mixture, which gives a divinylbenzene content of 3 percent based upon the total weight of the second monomer mixture. All remaining procedures are the same. The oxidation stability data appears in Table I.

EXAMPLE 6

The procedure of Example 2 is substantially repeated, except that para-methylstyrene is not used in the seed copolymer particles. The seed copolymer particles are 2.5 percent by weight cross-linked styrene/divinylbenzene copolymer particles having a volume average particle diameter of 210 μm. The first monomer mixture contains 164 g of para-methylstyrene, 16.2 g of the divinylbenzene mixture, and 0.65 g of the 50 percent t-butylperoctoate solution with 0.34 g of t-butylperbenzoate. The first monomer mixture therefore has a divinylbenzene content of 5 percent. The second monomer mixture is continuously fed to the reactor at a rate of 2.6 g/min over a 240 min period. The second monomer mixture contains 583 g of para-methylstyrene and 33.2 g of the divinylbenzene mixture, which gives a divinylbenzene content of 3 percent based upon the total weight of the second monomer mixture. All remaining procedures are the same. The oxidation stability data appears in Table I.

EXAMPLE 7

Chromatographic Separation of Fructose and Glucose

The resin prepared in Example 2 is evaluated for chromatographic performance in separating fructose and glucose. The resin has an average particle diameter of 440 μm. A 800 mL portion of the resin is placed in a 25 mm×1280 mm jacketed glass chromatography column with an attached expansion column. The resin is back-flushed with degassed, deionized water for 60 min which is followed by two hr of backflushing with an aqueous calcium chloride solution (7 g CaCl$_2$/100 mL solution). The resin is then equilibrated with the calcium chloride solution for at least six hr, tapped down to provide a uniform packing, and sealed. The column is then flushed with degassed, deionized water and heated to a temperature of 60° C.

A total of about 78 mL of a hot (60° C.) commercial high fructose corn syrup of 50 percent dissolved solids content is fed to the column at a rate of 11-13 mL/min. The composition of the solids is fructose: 41-43 percent: glucose: 50-52 percent: and oligosaccharides: 6-7 percent. Immediately after the syrup is loaded on the column, it is eluted with 60° C. degassed, deionized water, again at a rate of about 11-13 mL/min. Samples of the effluent from the column are collected at half-minute intervals and quantitatively analyzed for the individual components eluting from the column. The experiment is continued until the product stream contains less than 1 percent dissolved solids. The glucose is eluted faster than the fructose, so the earlier samples are rich in glucose and the later fractions are rich in fructose.

The results indicate that the percent yield of fructose is 31 percent. Percent yield is determined from the consecutive samples collected at the end of the experiment which cumulatively have a fructose purity of 80 percent, i.e., the weight ratio of fructose to total carbohydrates contained in the samples, is 80 percent. The percent yield is 100 times the total amount of fructose contained in those samples divided by the total amount of fructose recovered before the experiment is terminated. The average production rate, in pounds of fructose per cubic foot of resin per hr at 80 percent purity, is 0.56. The average concentration of carbohydrate in the product cut is 4.8 g 100 mL. No oxidative degradation of the resin is apparent.

Similar oxidation stability is expected using cation-exchange resins prepared from copolymer beads employing other para-substituted styrenic monomers, or having functional groups such as phosphonic acid or carboxylic acid groups, as previously disclosed herein.

What is claimed is:

1. A method for improving the resistance of styrenic cation-exchange resins to oxidative degradation by incorporating into the copolymer beads a para-substituted styrenic monomeric unit of the formula

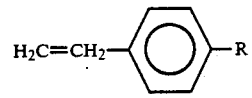

wherein R is phenyl or an aliphatic moiety having up to 8 carbon atoms.

2. The method of claim 1 wherein R is methyl, ethyl, propyl, or butyl.

3. The method of claim 1 wherein R is methyl.

4. The method of claim 1 wherein the copolymer beads are prepared by a seeded polymerization process.

5. The method of claim 1 wherein the copolymer beads are microporous.

6. The method of claim 1 wherein the copolymer beads are macroporous.

7. The method of claim 1 wherein the cation-exchange functional groups are sulfonic acid, phosphonic acid, phosphinic acid, arsonic acid, or carboxylic acid groups.

* * * * *